(12) United States Patent
Ueshima et al.

(10) Patent No.: US 6,607,436 B1
(45) Date of Patent: Aug. 19, 2003

(54) BALL PADDLE GAME DEVICE

(75) Inventors: Hiromu Ueshima, Kusatsu (JP); Katsuya Nakagawa, Kusatsu (JP)

(73) Assignee: SSD Company Limited, Shiga (JP)

(*) Notice: Subject to any disclaimer, the term of this patent is extended or adjusted under 35 U.S.C. 154(b) by 41 days.

(21) Appl. No.: 09/856,177

(22) PCT Filed: Oct. 2, 2000

(86) PCT No.: PCT/JP00/06871

§ 371 (c)(1), (2), (4) Date: Jun. 4, 2001

(87) PCT Pub. No.: WO01/24897

PCT Pub. Date: Apr. 12, 2001

(30) Foreign Application Priority Data

Oct. 4, 1999 (JP) .......................................... 11-283234

(51) Int. Cl.$^7$ ................................................ A63F 13/00
(52) U.S. Cl. ............................................ 463/3; 463/31
(58) Field of Search .................................. 463/2, 3, 31

(56) References Cited

U.S. PATENT DOCUMENTS 4,504,062 A * 3/1985 Smith, III et al. ............. 463/2
5,184,830 A * 2/1993 Okada et al. ............. 463/31 X

FOREIGN PATENT DOCUMENTS

| EP | 0 903 169 A2 | 3/1999 |
| JP | 54-156651 | 4/1979 |
| JP | 58-223087 | 12/1983 |
| JP | 2-77285 | 3/1990 |

* cited by examiner

Primary Examiner—Tony M. Argenbright
(74) Attorney, Agent, or Firm—Arent Fox Kintner Plotkin & Kahn, PLLC

(57) ABSTRACT

A ball paddle game apparatus (10) has a game machine (12) connected to a television monitor. (18). A paddle key (28a–28d) is provided on a game machine (12). On the game screen of the monitor, a ball moves on the ball movement route in the number corresponding to the number of paddles. A paddle is displayed on the moving route. At the push of a paddle key (28), the corresponding paddle hits the ball. If the timing of operating a paddle key (28) and the timing of a ball movement agrees, then it is a success. If not, then it is a failure.

11 Claims, 4 Drawing Sheets

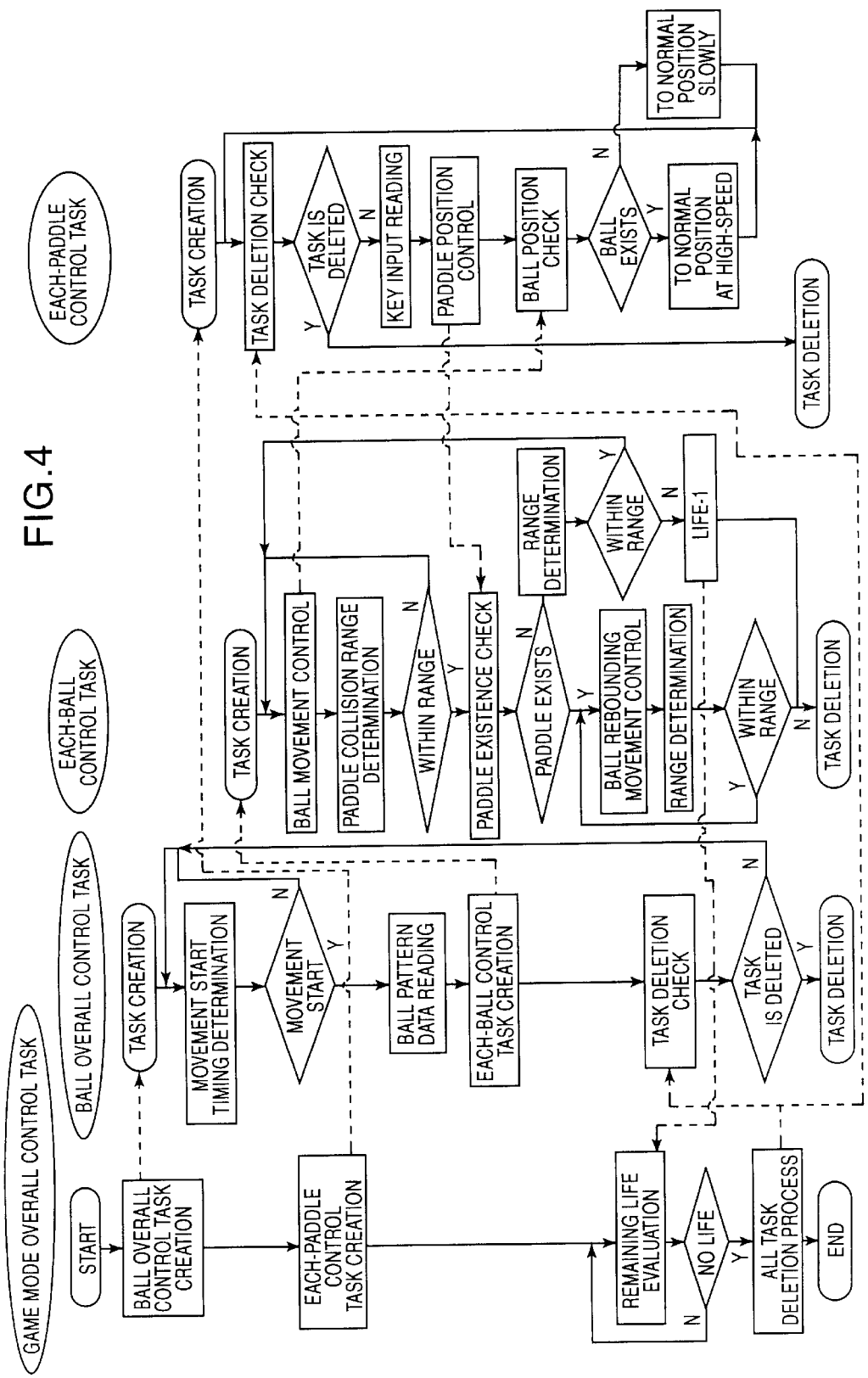

BALL PADDLE GAME DEVICE

TECHNICAL FIELD

This invention relates to a ball paddle game apparatus. Specifically, the invention relates to a novel ball paddle game apparatus having several routes of ball movement formed on the game screen of a television monitor, so that a moving ball on the ball movement route is to be hit by a plurality of paddles provided in the course of the ball movement route.

PRIOR ART

Recently, TV game software associating music with a game operation has gained wide popularity. In an example of a music game, a music script or a music-script key to be operated is displayed for scrolling from up to down at a left side of the screen. In compliance with the music script, a player is allowed to operate a game controller or an dedicated keyboard-type input device according to the instructions thereof. The script in a scroll display vanishes from the screen in a certain elapsed time. Therefore, there is a need to operate the controller or input device in a required time. If there is a failure to do so, points will be reduced.

Although the conventional music TV games are a new form in the combination of a music and a game, they are nothing more than a TV game. Accordingly, for enjoyment, it is necessary to prepare both a game console and software therefore, resulting in an inexpensive price.

SUMMARY OF THE INVENTION

Therefore, it is a primary object of the present invention to provide a ball paddle game apparatus at a lower cost than a music game according to the necessity.

The present invention is a ball paddle game apparatus including a television monitor and a game machine connected thereto. The game apparatus has a plurality of paddle keys and a game processor for receiving a manipulating signal from the paddle keys. The game processor displays, on the television monitor, a plurality of paddle figures responsive to each operation of the paddle keys and a plurality of ball figures moving on a predetermined pattern of a plurality of moving routes respectively corresponding to the paddle figures. The game processor gives, as a player operates the paddle key, a change in the paddle figures to change the ball figures.

A ball moves toward the paddle randomly in each of a plurality of ball moving routes. The player is allowed to operate the paddle key to bounce back the ball. If the timing of operating a paddle matches the timing of a moving ball, the ball changes its moving direction on the game screen. For example, in the case the ball movement is a fall of the ball, the ball hit by the paddle is shot up, and then disappears in the end. In the case of missing the ball, the ball continues falling and finally vanishes. Life (the number of times of games to be played) is reduced upon failure. Whether life remains or not determines the possibility of continuing the game.

The ball may be moved along with the music, or moved regardless of music. In the former case, it is possible to enjoy a music game.

According to the present invention, once a ball is set to move along with the music, it is possible to enjoy music with a simple game with a paddle to hit a ball. Or, even in the absence of music, it requires a hand in order to use a paddle.

In addition, the game itself has an aspect of enjoyment, it is expected to put into an effective use for the purposes of rehabilitating disabled persons and the elderly.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a flowchart showing function of the FIG. 1 embodiment.

BEST FORM FOR PRACTICING THE INVENTION

Figure 1:
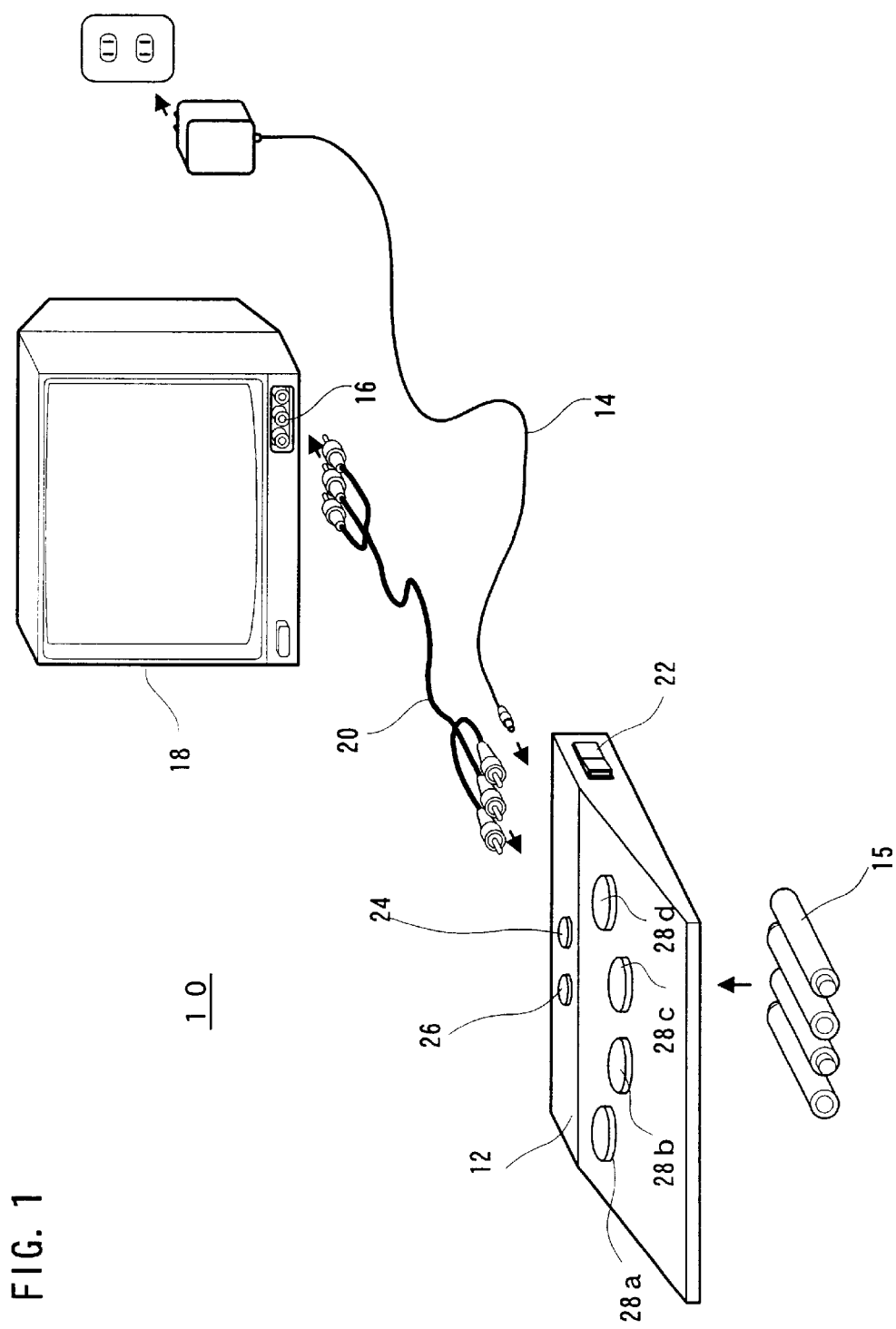
FIG. 1 is a structural view showing the ball paddle game apparatus of an embodiment of the present invention.

A paddle game machine 10 in this embodiment shown in FIG. 1 includes a game machine 12. The game machine 12 is fed direct current power by an AC/DC adaptor 14 or battery 15. The game machine 12 is connected to an AV input 16 of the television monitor 18 by way of an AV cable 20. The game machine 12 possesses a housing made of a material such as plastic. Power switch 22 is provided on the surface of the housing. In addition, start key 24 and music select key 26 are placed on a surface of the housing at a deeper side. The start key 24 is operated at a start of a game. The music select key 26 is to choose any of the pre-entered pieces of music when playing a game along the music as hereinafter referred.

The side housing of the game machine 12 is slightly slanted to the player's side. A plurality of paddle keys (four as in the embodiment) 28a, 28b, 28c and 28d are placed at a proper interval. These paddle keys 28a–28c are to be operated manually by the player. For this reason, it is preferable that the paddles be arranged not on a straight line but in positions easy for player's finger operation.

Figure 2:
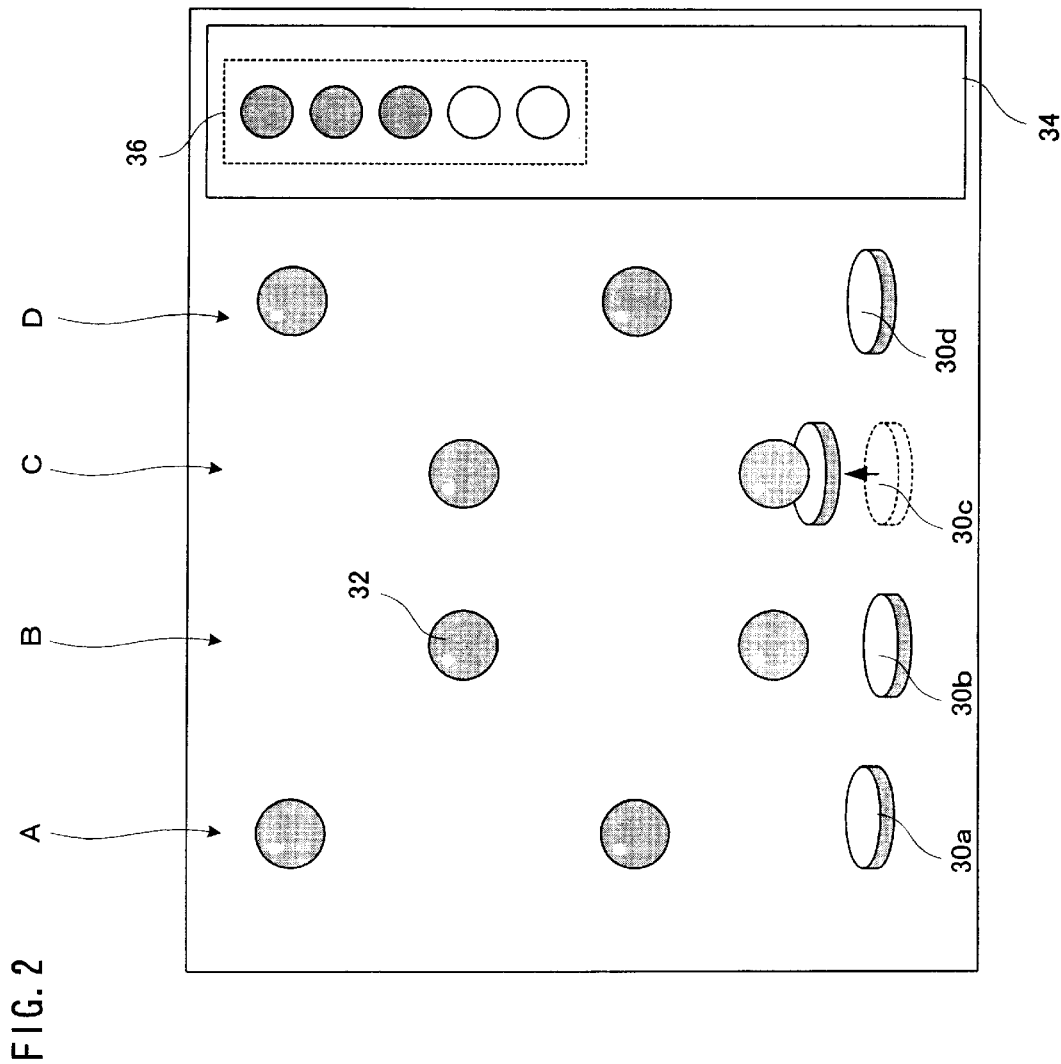
FIG. 2 is an illustrative view showing an example of a game screen in FIG. 1 embodiment.

The ball paddle game apparatus in FIG. 1 presents a TV game display as shown in the television monitor 18 of the FIG. 2. On the game screen, a plurality of ball moving routes (four as in the embodiment) A, B, C and D is formed. A ball FIG. 32 (hereinafter may be referred to as "ball") moves on the route A–D. In the embodiment, the ball 32 is displayed as if it were falling. However, it is possible to set the movement of ball 32 in any direction, such as from top to bottom, conversely from bottom to top, from either left or right to the other side or vertically in a diagonal direction.

Although the ball falls on the moving route A–D, the ball follows a fixed pattern. For example, the ball drops in any arbitrary line out of four consecutively, or the balls drop at two or more lines simultaneously. Paddle figures (hereinafter, may be briefly referred to as "paddle") 30a, 30b, 30c and 30d are arranged and displayed, for example, on a straight horizontal line. Having said that, the position of height of each paddle 30a–30d is not necessarily the same as shown in the embodiment, but each may be set at a different height.

When the player selects music by a music select key 26 in the paddle game apparatus 10, the music is played. It is preferable that the balls 32 fall along the rhythm of the music or to the tempo of the music. The player operates a paddle key 28a–28d as shown in FIG. 1, hitting a ball 32 skillfully by the paddle 30a–30d. If the ball is hit by the paddle successfully, in the embodiment the ball is bounced upward by the paddle. If the paddle key 28 is operated in delayed timing and the ball is unsuccessfully hit by the paddle, the ball in the embodiment moves down and then vanishes.

In the case of failure, a life is decreased by one on the game information display area 36 and one of the life figures goes out. Note that the life means the number of game plays that a game player can try.

In this embodiment, if the paddle key 28 is operated out of the timing of a ball's falling, a penalty is imposed, e.g., a dull movement of the paddle 30 thereafter. This prevents the player from playing the game departing from a normal way of enjoying a game, such as simultaneous use of four keys 28a–28d at all times by the player.

Figure 3:
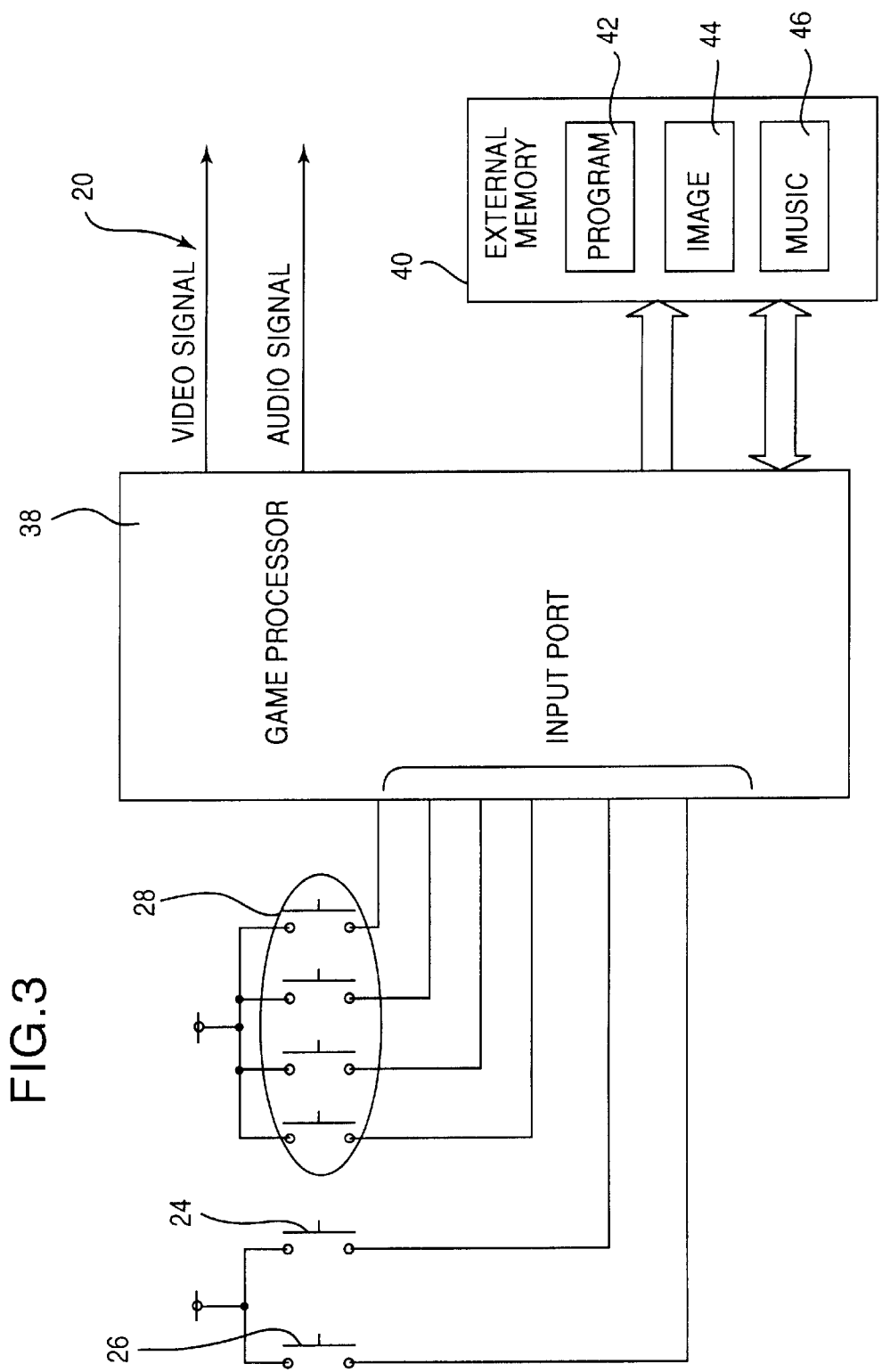
FIG. 3 is a block diagram showing an example of the FIG. 1 embodiment.

As shown in FIG. 3, the game machine 12 includes a game processor 38. Although the game processor 38 can use any processor, a high-speed processor developed by the applicant company and already applied for a patent is used in this embodiment. This high-speed processor is concretely disclosed in Japanese Patent Laid-open No. H10-307790 [G06F13/36,15/78] (corresponding U.S. Pat. No. 6,070, 205).

The game processor 38, although not shown, includes various processors such as CPU, graphic processor, sound processor and DMA processor. In addition also included are an A/D converter for taking in an analogue signal and an input/output control circuit which receives an input signal such as key manipulating signal and gives an output signal to an external apparatus. The CPU executes a required operation corresponding to an input signal, and then it sends a result thereof to other processors. The graphic processor executes a required graphic process depending upon a result of the operation and creates a changing game image. Likewise, the sound processor executes a required sound process depending upon a result of the operation.

The game processor 38 is connected with an external memory 40 through an external bus. The external memory 40 is a ROM and/or RAM including a program area 42, an image data area 44 and a music data area 46. The program area 42 stores a game control program shown FIG. 4 hereinafter referred. The image data area 44 stores an image data for a ball FIG. 32, a paddle 32 and other necessary image data. The music data area 46 stores a plurality of music data as explained before. Specifically, these are music script data of the music (corresponding to MIDI data) and sound waveform data of each music instrument to play the music. If the name of the music names are displayed on a television monitor 18 (FIG. 1) and a desired music is chosen by a music selection key 26 (FIG. 1, FIG. 3), the music script data and the sound waveform data are read from a music area 46 and supplied to a sound processor in the game processor 38.

It is noted that a music data area 46 (or other areas) is set in advance, with ball pattern data to set a falling pattern of a ball to the music.

Furthermore, a signal of each of keys, 24,26 and 28a–28d shown in FIG. 1 is inputted in an input port of a game processor 38, namely, an input/output control circuit. The video signal (for forming a game image) and audio signal (music) from a game processor 38 is fed into a television monitor 18 by way of an AV cable 18.

The game processor 38 executes a game program in accordance with a flowchart shown in FIG. 4. As shown in FIG. 4, in a game mode overall control task, a ball overall control task and an each-paddle control task are created in required timing. The ball overall control task creates each-ball control tasks in necessary timing.

The ball overall control task determines the timing of starting a ball movement. This ball movement start timing is preferably arranged according to the rhythm and tempo of a music selected by a player. At a time of ball movement start, the game processor 38 reads ball pattern data from the music data area 46 (FIG. 3), and creates an each-ball control task.

The each-ball control task controls a falling movement of a ball and determines a range of a paddle collision position. That is, because a collision area to be hit by a paddle 30 (FIG. 2) is set in a certain range in the course of falling of a ball, it is determined whether the paddle exists within the collision range. The paddle staying within the collision range means a successful hitting of a ball by the paddle. In this case, the each-ball control task controls a bouncing of the ball. Therefore, the ball is bounced back by the paddle and moves upward on the moving route. If the ball is bounced to a ball vanishing area, the each-ball control task regarding the ball is deleted.

In the case that the paddle does not exist in the collision area, the ball control task executes a range determination once again after updating position of the ball. The range determination, in this case, is to see if, although once failed to hit, it is within a position to try to hit again. If the range determination is "Yes", the process returns to the initial each-ball control task of a ball movement control task. In the case of "No", as the ball hit is completely unsuccessful, each-ball control task is, while reducing a life by one, deleted.

In the ball overall control task, each-paddle control task is created in appropriate timing of starting an execution of an each-ball control task. In the each-paddle control task, whether the task has been deleted or not, i.e., whether a ball to be hit by the paddle still exists, is deleted. If there is none, the task is terminated.

When the task is not deleted, in the each-paddle control task a key manipulating signal of paddle key 28a–28d is read to control the paddle in a required position according to the key signal. A check is made for a ball on the moving route including that paddle. In [the] case there is a ball corresponding to the paddle, the paddle is placed back at high speed to the normal position (in FIG. 2, the normal position denotes a position of the paddle 30 indicated by the dotted line). If there is no ball, this means that a paddle key is operated in the absence of a ball. This results in the penalty as described earlier. Therefore, in this case, the paddle is slowly returning to the normal position to delay the next paddle operation, thereby interferes the next paddle operation. This is the penalty on useless operation of the paddle.

In the case the life is decremented in the previous each-ball control task, in the ball overall control task a life evaluation is executed to determine whether the life remains. When the remaining life does not exist, or all of each-ball control task is deleted, a deleting process on all tasks is executed. In this case, playing the music is stopped. Therefore, in order to listen to the entire portion of the music selected by the player, it is necessary to keep the life until the end of the music.

In the above embodiment, as the timing of ball movement and a ball pattern is set to the music, it is possible to enjoy a game to hit a ball with the paddle in the presence of music. However, music is not always required, and this invention includes both the case of setting to music and the case of moving a ball without regard to music.

Furthermore, the above description, using a television monitor 18 as display means, explained the embodiment that the television monitor 18 was connected to the game machine 12. However, such display means may be a small display like a liquid crystal display. In this case, it is possible for the small display to be integrated with the game machine 12.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A ball paddle game apparatus, comprising:

a plurality of paddle keys provided on the game apparatus and a game processor for receiving a manipulating signal from said paddle keys, wherein said game processor displays, on display means, a plurality of paddle figures in response to said manipulating signal from said paddle keys and a plurality of ball figures moving in a predetermined pattern of a plurality of moving routes respectively corresponding to said paddle figures, and wherein said game processor operates to change the movement of said ball figure in said predetermined pattern corresponding to the timing of a player's operation of said paddle key to move said paddle figure to change said ball figure.

2. A ball paddle game apparatus according to claim 1, wherein said game processor displays said ball figures to move vertically downward at appearance thereof and changes in moving direction to vertically upward when the game player operates said paddle key in proper timing.

3. A ball paddle game apparatus according to any of claims 1 or 2, wherein said game processor further comprises sound processing means to reproduce music, to cause said ball figures to appear in synchronism with the music reproduction.

4. A ball paddle game apparatus according to claims 1 or 2, wherein said game processor causes a change in said ball figures when said ball figure is in a predetermined range when the game player operates said paddle key and reduces a point on the game without causing a change when the game player operates the said paddle key where said ball figure is not in the predetermined range, wherein the game is predetermined when point reduction exceeds a certain reference value.

5. A ball paddle game apparatus connected to a television monitor, comprising:

a plurality of paddle keys provided on the game apparatus, a game processor for receiving a manipulating signal from said paddle keys, and a memory, wherein said game processor displays, on said television monitor, a plurality of paddle figures in response to said manipulating signal from said paddle keys and a plurality of ball figures moving in a predetermined pattern of a plurality of moving routes respectively corresponding to said paddle figures, wherein said memory stores ball pattern data indicating at least appearance combinations of said ball figures at each predetermined timing, and wherein said game processor sequentially reads-out said ball pattern data from said memory at the each predetermined timing so as to make said ball figure appear on said respective corresponding moving routes, and operates to change the movement of said ball figure in said predetermined pattern corresponding to the timing of a player's operation of said paddle key to move said paddle figure to change said ball figure when the ball figure exists within a predetermined distance from the moved paddle figure on said moving route in correspondence to the moved paddle figure.

6. A ball paddle game apparatus according to claim 5, wherein said memory includes a music data area including at least said ball pattern data and a music score data, and wherein said game processor reproduces a piece of music according to said music score data, and sequentially reads-out said ball pattern data thereby to make said ball figures appear on said moving routes in synchronous with rhythm or tempo of said piece of music.

7. A ball paddle game apparatus according to claim 5, wherein said ball figures are able to simultaneously appear in a plural number while only one ball figure on each of said moving routes, and each of said paddle figures is able to simultaneously change the movement of each of said plural number of ball figures.

8. A ball paddle game apparatus according to claim 5, wherein said moving routes extend downwardly on the screen of said television monitor, and wherein said game processor makes said ball figures fall-down as the movement on said moving routes.

9. A ball paddle game apparatus according to claim 8, wherein said game processor moves any of said ball figures upwardly on the screen of said television monitor when the ball figure exists within said predetermined distance from the moved paddle figure.

10. A ball paddle game apparatus according to claim 5, wherein said game processor returns said paddle figure to a home position slowly when none of said ball figures exists within said predetermined distance from the moved paddle figure.

11. A ball paddle game apparatus according to claim 5, wherein said game processor executes steps of:

setting a ball vanishing area and a collision area;

displaying on said television monitor a predetermined number of life figures, creating tasks respectively corresponding to said ball figures as making said ball figures appear on the screen;

deleting each of said tasks when the ball figure reaches said ball vanishing area as a result of changing the movement of the ball figure by the paddle figure;

deleting each of said tasks and reducing the number of said life figures by one when the ball figure passes through said collision area as a result of failure of said paddle figure to change the movement of the ball figure; and stopping reproduction of said piece of music when the number of said life figures becomes zero or when all said tasks are deleted.

* * * * *